US012732287B2

(12) United States Patent
Kim

(10) Patent No.: US 12,732,287 B2
(45) Date of Patent: Sep. 8, 2026

(54) BATTERY MANAGEMENT SYSTEM AND METHOD OF OPERATING THE SAME

(71) Applicant: Samsung SDI Co., Ltd., Yongin-si (KR)

(72) Inventor: Minsu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 75 days.

(21) Appl. No.: 18/634,778

(22) Filed: Apr. 12, 2024

(65) Prior Publication Data

US 2025/0175264 A1 May 29, 2025

(30) Foreign Application Priority Data

Nov. 24, 2023 (KR) ........................ 10-2023-0165832

(51) Int. Cl.

| | |
|---|---|
| ***H01M 10/42*** | (2006.01) |
| ***H04B 17/318*** | (2015.01) |
| ***H04B 17/391*** | (2015.01) |
| *H04B 17/309* | (2015.01) |

(52) U.S. Cl.

CPC .......... *H04B 17/318* (2015.01); *H01M 10/42* (2013.01); *H01M 10/425* (2013.01); *H04B 17/3913* (2015.01); *H01M 2010/4271* (2013.01); *H04B 17/346* (2023.05)

(58) Field of Classification Search

CPC ................ H04B 17/318; H04B 17/346; H04B 17/3913; H01M 10/425; H01M 2010/4271

See application file for complete search history.

(56) References Cited

U.S. PATENT DOCUMENTS

| | | | | |
|---|---|---|---|---|
| 2011/0216451 | A1 | 9/2011 | Haines et al. | |
| 2020/0225288 | A1* | 7/2020 | Park | G01R 31/396 |
| 2021/0354573 | A1 | 11/2021 | Widmer et al. | |

FOREIGN PATENT DOCUMENTS

| | | | |
|---|---|---|---|
| JP | 2018-78794 | A | 5/2018 |
| KR | 10-2374980 | B1 | 3/2022 |
| KR | 10-2023-0069372 | A | 5/2023 |

OTHER PUBLICATIONS

EPO Extended European Search Report dated Feb. 6, 2025, issued in European Patent Application No. 24193402.5, 14 pages.

* cited by examiner

*Primary Examiner* — Benyam Haile

(74) *Attorney, Agent, or Firm* — Womble Bond Dickinson (US) LLP

(57) ABSTRACT

A battery management system includes: a contactor connected to a battery; a battery manager configured to output a control signal for controlling a state of the contactor to the contactor; a signal processor configured to receive a radio frequency (RF) signal generated during switching of the state of the contactor and to generate, based on the RF signal, a plurality of signal strength values respectively corresponding to a plurality of frequency bands; and a contactor state estimator configured to generate a state estimate value for estimating the state of the contactor by receiving the plurality of signal strength values and inputting the plurality of signal strength values into a pre-trained neural network model.

18 Claims, 7 Drawing Sheets

1000
LOAD
100
BATTERY MANAGER
SIG CTR
SIG TRG
SEV
300
CONTACTOR STATE ESTIMATOR
SS
11
200
250
Controller
SIG FD
DSP
240
220
SIG DIG
210
SIG RF
SIG RF
RF Tuner
SIG BD
ADC
230
Antenna

FIG. 5C

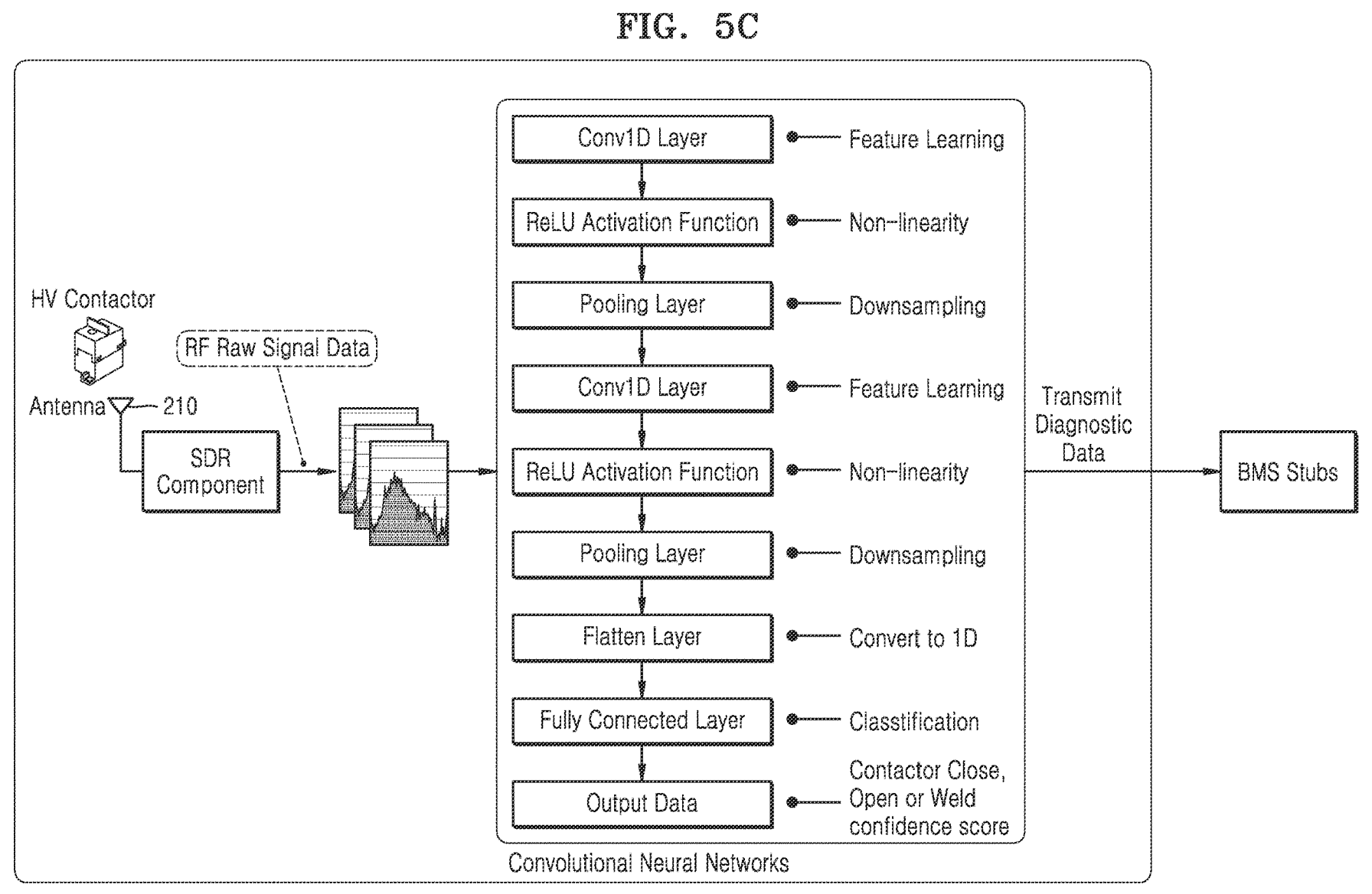

HV Contactor
Antenna
210
SDR Component
RF Raw Signal Data
Conv1D Layer
Feature Learning
ReLU Activation Function
Non-linearity
Pooling Layer
Downsampling
Conv1D Layer
Feature Learning
ReLU Activation Function
Non-linearity
Pooling Layer
Downsampling
Flatten Layer
Convert to 1D
Fully Connected Layer
Classtification
Output Data
Contactor Close, Open or Weld confidence score
Convolutional Neural Networks
Transmit Diagnostic Data
BMS Stubs

BATTERY MANAGEMENT SYSTEM AND METHOD OF OPERATING THE SAME

CROSS-REFERENCE TO RELATED APPLICATION

The present application claims priority to and the benefit of Korean Patent Application No. 10-2023-0165832, filed on Nov. 24, 2023, in the Korean Intellectual Property Office, the entire disclosure of which is incorporated herein by reference.

BACKGROUND

1. Field

Aspects of one or more embodiments relate to a battery management system and a method of operating the same.

2. Description of the Related Art

Battery management systems (BMSs) for vehicles manage the performance and safety of battery packs in electrical vehicles (xEVs). The BMSs monitor charging states, voltages, temperatures, and the like of batteries, and control charging and discharging of the batteries on the basis of the same. The BMSs also detect abnormal states of the batteries and may take protective measures if needed.

Contactors are components that may be utilized in the BMSs, and control electrical connections between the batteries, and electrical systems of the vehicles. The contactors switch between open and closed states to control charging and discharging of the batteries. Noise signals may be generated in a process of switching the states of the contactors, and the noise signals may be used to detect normal states and abnormal states of the contactors.

In some methods, the states of the contactors may be detected by using physical sensors. The physical sensors may determine the states of the contactors by measuring positions, currents, voltages, and the like of the contactors. However, in some methods, additional hardware may be utilized and the reliability of the results of determining the states of the contactors may be lowered due to errors or failures of the physical sensors.

The above information disclosed in this Background section is only for enhancement of understanding of the background and therefore the information discussed in this Background section does not necessarily constitute prior art.

SUMMARY

Aspects of one or more embodiments include a battery management system and method of detecting a radio frequency (RF) signal generated during switching of a state of a contactor in the battery management system and determining the state of the contactor on the basis of a signal strength value generated from the RF signal and a pre-trained neural network model.

However, characteristics of embodiments according to the present disclosure are not limited to the above-described characteristics, and other characteristics not mentioned may be clearly understood by one of ordinary skill in the art from the description of embodiments according to the present disclosure described below.

Additional aspects will be set forth in part in the description which follows and, in part, will be apparent from the description, or may be learned by practice of the embodiments according to the present disclosure.

According to one or more embodiments, a battery management system includes a contactor connected to a battery, a battery manager configured to output a control signal for controlling a state of the contactor to the contactor, a signal processor configured to receive a radio frequency (RF) signal generated during switching of the state of the contactor and generate, on the basis of the RF signal, a plurality of signal strength values respectively corresponding to a plurality of frequency bands, and a contactor state estimator configured to generate a state estimate value for estimating the state of the contactor by receiving the plurality of signal strength values and inputting the plurality of signal strength values into a pre-trained neural network model.

According to some embodiments, the battery manager may be further configured to output a trigger signal to the signal processor in response to the output of the control signal, and the signal processor may be further configured to capture the RF signal in response to the trigger signal.

According to some embodiments, the signal processor may include an antenna configured to receive the RF signal, an RF tuner configured to output a band signal in a preset frequency band from among the RF signal, an analog-to-digital converter (ADC) configured to convert the band signal into a digital signal, a digital signal processor (DSP) configured to transform the digital signal into a frequency domain signal by performing Fourier transform on the digital signal and generate the plurality of signal strength values from the frequency domain signal, and a signal processor controller configured to control the antenna, the RF tuner, the analog-to-digital converter (ADC), and the digital signal processor (DSP) in response to the trigger signal and transmit the plurality of signal strength values to the contactor state estimator.

According to some embodiments, the preset frequency band may be 100 kHz or more and 5 MHz or less.

According to some embodiments, widths of the plurality of frequency bands may be same as one another on a log scale.

According to some embodiments, the widths of the plurality of frequency bands may be same as one another.

According to some embodiments, the neural network model may include a convolutional neural network (CNN) model and may be pre-trained with training data comprising the plurality of signal strength values generated by preprocessing the state of the contactor switched by the control signal of the battery manager and the RF signal generated during switching of the state of the contactor.

According to some embodiments, the control signal may include a turn on signal for switching the contactor to an open state and a turnoff signal for switching the contactor to a closed state.

According to some embodiments, the pre-trained neural network model may be configured to output the state estimate value according to the plurality of signal strength values, which are received as an input, and a confidence score of the state estimate value.

According to some embodiments, the battery manager may be configured to detect whether the contactor is in an abnormal state, on the basis of the state estimate value and the confidence score of the state estimate value.

According to some embodiments, the battery manager may be further configured to determine the state of the contactor as the abnormal state, on the basis of at least one state from among the closed state according to the state estimate value of the contactor that responds to the turn on signal, the open state according to the state estimate value of the contactor that responds to the turnoff signal, and the weld state according to the state estimate value of the contactor.

According to one or more embodiments, a method of operating a battery management system including a contactor connected a battery includes outputting a control signal for controlling a state of the contactor to the contactor, receiving an RF signal generated during switching of the state of the contactor, generating, on the basis of the RF signal, a plurality of signal strength values respectively corresponding to a plurality of frequency bands, and generating a state estimate value for estimating the state of the contactor by inputting the plurality of signal strength values into a pre-trained neural network model.

According to some embodiments, the method may further include extracting a trigger signal in response to the output of the control signal, and capturing the RF signal in response to the trigger signal.

According to some embodiments, the method may further include receiving the RF signal, outputting a band signal in a preset frequency band from among the RF signal, converting the band signal into a digital signal, transforming the digital signal into a frequency domain signal by performing Fourier transform on the digital signal and generating the plurality of signal strength values from the frequency domain signal, and extracting the plurality of signal strength values in response to the trigger signal.

According to some embodiments, the control signal may include a turn on signal for switching the contactor to an open state and a turnoff signal for switching the contactor to a closed state.

According to some embodiments, the pre-trained neural network model may be configured to generate the state estimate value according to the plurality of signal strength values, which are received as an input, and a confidence score of the state estimate value.

According to some embodiments, the method may further include detecting whether the contactor is in an abnormal state, on the basis of the state estimate value and the confidence score of the state estimate value.

According to some embodiments, the method may further include determine the state of the contactor as the abnormal state, on the basis of at least one state from among the closed state according to the state estimate value of the contactor that responds to the turn on signal, the open state according to the state estimate value of the contactor that responds to the turnoff signal, and the weld state according to the state estimate value of the contactor.

According to one or more embodiments, a computer program is stored in a medium to execute the method of operating the battery management system described above by using a computing apparatus.

BRIEF DESCRIPTION OF THE DRAWINGS

The above and other aspects, features, and characteristics of certain embodiments of the present disclosure will be more apparent from the following description taken in conjunction with the accompanying drawings, in which:

The following drawings attached to the description illustrate embodiments of the present disclosure and serve to further understand the technical spirit of the present disclosure, together with the detailed description of the present disclosure described below, and thus, the present disclosure should not be construed as limited to the matters described in the drawings.

FIG. 5C is an example schematically illustrating a process of training a pre-trained ANN model, according to some embodiments of the present disclosure.

DETAILED DESCRIPTION

Figure 1:
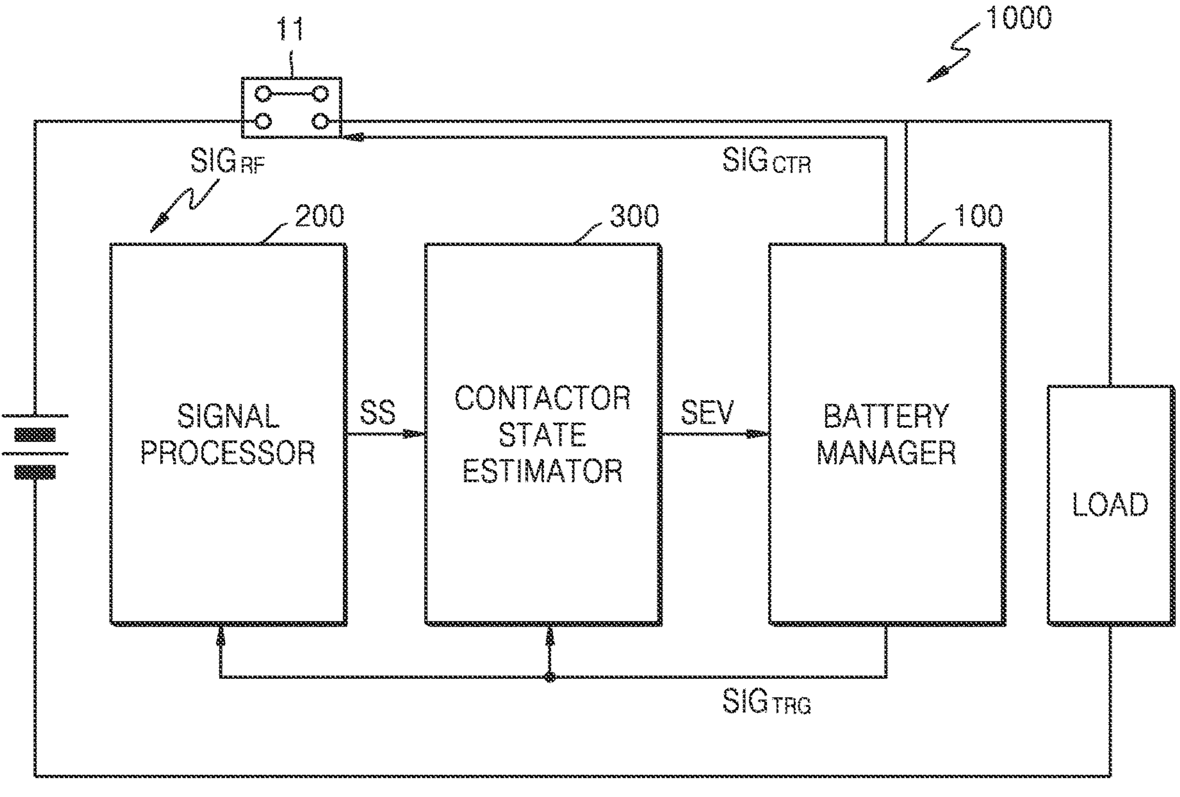
FIG. 1 schematically illustrates a battery management system according to some embodiments of the present disclosure.

Reference will now be made in more detail to aspects of some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," if preceding a list of elements, modify the entire list of elements and do not modify the individual elements of the list.

Hereinafter, example embodiments of the present disclosure will be described in detail with reference to the accompanying drawings. Prior to the description, terms or words used in the description and claims should not be interpreted only in a normal or dictionary sense, and should be interpreted as meanings and concepts consistent with the technical spirit of the present disclosure based on the principle that the inventor may appropriately define the concepts of the terms to describe the present disclosure in the best way. Therefore, it should be understood that embodiments described in the description and components shown in the drawings are only some embodiments of the present disclosure and do not represent all of the technical spirits of the present disclosure and thus there may be various equivalents and modified examples that may replace the embodiments and components at the time of filing the present application. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. When describing embodiments of the present disclosure, "~ can" and "~ may" may include "one or more embodiments of the present disclosure".

Although the terms first, second, etc. may be used herein to describe various elements or components, these elements or components should not be limited by these terms. These terms are only used to distinguish one element or component from another element or component, and a first element could be termed a second element unless the context clearly indicates otherwise.

Unless the context clearly indicates otherwise, each component may be singular or plural throughout the description.

Throughout the description, "A and/or B" means A, B or A and B unless the context clearly indicates otherwise. As used herein, the term "and/or," includes any and all combinations of one or more of the associated listed items. "C or D" means C or more and D or less unless the context clearly indicates otherwise.

FIG. 1 schematically illustrates a battery management system (BMS) according to some embodiments of the present disclosure.

Referring to FIG. 1, a BMS 1000 may include a contactor (or switch) 11 connected to a battery, a battery manager 100, a signal processor 200, and a contactor state estimator 300.

The BMS 1000 may be a significant component that manages performance and safety of a battery pack in an electrical vehicle (xEV). The BMS 1000 may monitor a state of charge, a voltage, a temperature, and the like of the battery and control charging and discharging of the battery on the basis of the same.

The contactor 11 may be one of components that play significant roles in the BMS 1000. For example, the contactor 11 may control an electrical connection between the battery and an electrical system of a vehicle. The contactor 11 may switch a state thereof to control charging and discharging of the battery. For example, the state of the contactor 11 may switch to an open state or a closed state. A radio frequency (RF) signal $SIG_{RF}$ may be generated from the contactor 11 in a process of switching the state of the contactor 11. The RF signal $SIG_{RF}$ may include noise, and the RF signal $SIG_{RF}$ including the noise may be used to detect a normal state and an abnormal state of the contactor 11.

The battery manager (or battery management component, or battery management circuit) 100 may be a component that controls an operation of the contactor 11 and outputs a signal for diagnosing the state of the contactor 11 to the signal processor 200 and the contactor state estimator 300. The battery manager 100 may output a control signal $SIG_{CTR}$ for controlling the state of the contactor 11 to the contactor 11. The control signal $SIG_{CTR}$ may include a turn on signal for switching the contactor 11 to an open state and a turnoff signal for switching the contactor 11 to a closed state. The battery manager 100 may output a trigger signal $SIG_{TRG}$ to the signal processor 200 and the contactor state estimator 300 in response to the output of the control signal $SIG_{CTR}$. For example, the trigger signal $SIG_{TRG}$ may be a signal including a command to detect the RF signal $SIG_{RF}$ generated from the contactor 11 and perform sampling. The battery manager 100 may include a microcontroller unit (MCU). According to some embodiments, the battery manager 100 may include a processor and a memory, wherein the memory stores instructions that, when executed by the processor, cause the battery manager 100 to execute various operations as described herein.

The battery manager 100 may detect whether the contactor 11 is in an abnormal state, on the basis of a state estimate value of the contactor 11 and a confidence level of the state estimate value. For example, the state of the contactor 11 according to the state estimate value of the contactor 11 may be at least one of the closed state, the open state, or a weld state. If the state of the contactor 11 is the weld state, the battery manager 100 may determine the state of the contactor 11 as the abnormal state.

The signal processor 200 may be a software defined radio (SDR). The SDR may be a wireless communication system that is implemented through software instead of components (e.g., a mixer, a filter, an amplifier, a modulator/a demodulator, a detector, and the like) previously implemented as analog hardware. If the SDR is used, an RF signal having a wide radio frequency may be captured, demodulated, and accessed with one piece of hardware. For example, the SDR may capture a wide frequency spectrum and selectively analyze a particular portion of an RF signal. The signal processor 200 (e.g., the SDR) may capture, in a frequency domain, the RF signal $SIG_{RF}$ generated during switching of the state of the contactor 11. The RF signal $SIG_{RF}$ may include a noise pattern, and the noise pattern may reflect an operation state of the contactor 11. In some embodiments, the noise pattern may have a unique pattern if the contactor 11 is in the open, closed, or weld state. The signal processor 200 may generate, on the basis of the RF signal $SIG_{RF}$, a plurality of signal strength values SS respectively corresponding to a plurality of frequency bands.

The signal processor 200 may capture the RF signal $SIG_{RF}$, which is generated from the contactor 11, in response to the trigger signal $SIG_{TRG}$. If the battery manager 100 outputs the control signal $SIG_{CTR}$ for controlling the state of the contactor 11 to the contactor 11, the signal processor 200 may receive the trigger signal $SIG_{TRG}$ from the battery manager 100. Components included in the signal processor 200 and operating processes thereof are described in more detail with reference to FIG. 2.

The contactor state estimator 300 may generate the state estimate value for estimating the state of the contactor 11 by receiving the plurality of signal strength values SS and inputting the plurality of signal strength values SS into a pre-trained neural network model. According to some embodiments, the neural network model may be a convolutional neural network (CNN) model. According to some embodiments of the present disclosure, the neural network model may be generated by a processor according to a certain aim and may refer to an artificial neural network (ANN) trained by a machine learning or deep learning technique. Aspects of an example structure of a neural network as described above is described in more detail below with reference to FIG. 5. The contactor state estimator 300 may include an MCU. The contactor state estimator 300 may further include a noise pattern processing unit (or noise pattern processor). According to some embodiments, the contactor state estimator 300 may include a processor and a memory, wherein the memory stores instructions that, when executed by the processor, cause the contactor state estimator 300 to execute various operations as described herein.

According to some embodiments, the neural network model may be pre-trained with training data including the plurality of signal strength values SS generated by preprocessing the state of the contactor 11 switched by the control signal $SIG_{CTR}$ of the battery manager 100 and the RF signal $SIG_{RF}$ generated during switching of the state of the contactor 11. The neural network model may output a state estimate value SEV according to the plurality of signal strength values SS, which are received as an input, and a confidence score of the state estimate value SEV. The contactor state estimator 300 may transmit the state estimate value SEV of the contactor 11 and confidence score data of the state estimate value SEV to the battery manager 100.

Figure 2:
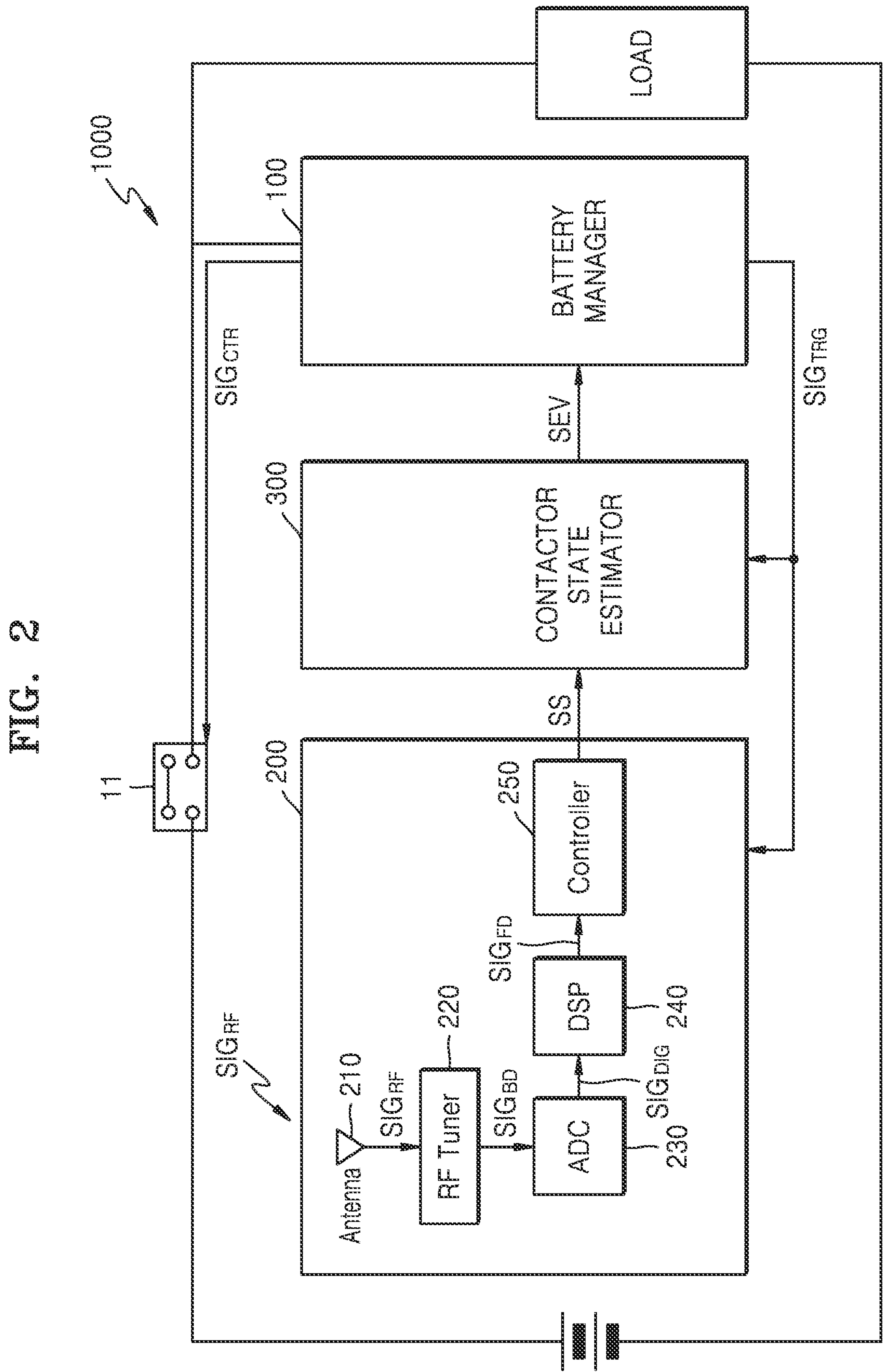
FIG. 2 schematically illustrates a process of operating a battery management system, according to some embodiments of the present disclosure.

FIG. 2 schematically illustrates aspects of a BMS 1000 for enabling a process of operating a BMS, according to some embodiments of the present disclosure.

Referring to FIG. 2, a BMS 1000 may diagnose a state of a contactor 11 by recognizing a noise pattern of a frequency-based RF signal $SIG_{RF}$ generated during switching of the state of the contactor 11 and analyzing the noise pattern of the RF signal $SIG_{RF}$ by using a pre-trained ANN.

The BMS 1000 may include the contactor 11 connected to a battery, a battery manager 100, a signal processor 200, and a contactor state estimator 300.

The contactor 11 may be one of components that perform significant roles in the BMS 1000. For example, the state of the contactor 11 may be an open state or a closed state. The RF signal $SIG_{RF}$ may be generated from the contactor 11 in a process of switching the state of the contactor 11.

The battery manager 100 may output a control signal $SIG_{CTR}$ for controlling the state of the contactor 11 to the contactor 11. The control signal $SIG_{CTR}$ may include a turn on signal for switching the contactor 11 to the open state and a turnoff signal for switching the contactor 11 to the closed state. The battery manager 100 may output a trigger signal $SIG_{TRG}$ to the signal processor 200 in response to the output of the control signal $SIG_{CTR}$. The battery manager 100 may output the trigger signal $SIG_{TRG}$ to the contactor state estimator 300.

The battery manager 100 may detect whether or not the contactor 11 is in an abnormal state, based on a state estimate value SEV of the contactor 11 and a confidence level of the state estimate value SEV. If the state of the contactor 11 according to the state estimate value SEV of the contactor 11, which responds to the turn on signal, is the closed state, the battery manager 100 may determine the state of the contactor 11 as the abnormal state. If the state of the contactor 11 according to the state estimate value SEV of the contactor 11, which responds to the turnoff signal, is the open state, the battery manager 100 may determine the state of the contactor 11 to be in the abnormal state. If the state of the contactor 11 according to the state estimate value SEV of the contactor 11 is in a weld state, the battery manager 100 may determine the state of the contactor 11 as being in the abnormal state.

The battery manager 100 may include an MCU. The MCU of the battery manager 100 may transmit an operation command to the contactor 11. For example, the MCU may transmit, to a power system, an operation command to activate the contactor 11. For example, the operation command may be a command indicating contactor on or a particular voltage/current level.

The MCU of the battery manager 100 may transmit, to the signal processor 200, the trigger signal $SIG_{TRG}$ commanding to start detecting the RF signal $SIG_{RF}$ of the contactor 11. For example, the signal processor 200 may include a noise pattern processing unit. For example, the trigger signal $SIG_{TRG}$ may be byte code such as START_NOISE_DETECTION. The MCU of the battery manager 100 may transmit the operation command to the contactor 11 and simultaneously transmit the trigger signal $SIG_{TRG}$ to the signal processor 200. For example, the trigger signal $SIG_{TRG}$ may include a timestamp, and thus, the detection of the RF signal $SIG_{RF}$ may be synchronized with the trigger signal $SIG_{TRG}$. For example, the trigger signal $SIG_{TRG}$ may be transmitted through a serial peripheral interface (SPI) protocol. However, embodiments according to the present disclosure are not limited thereto, and any communication protocol that transmits data or commands in a BMS may be applied.

The MCU of the BMS 1000 may adjust a system parameter on the basis of analysis data according to the state estimate value SEV of the contactor 11. For example, the MCU may diagnose the state of the contactor 11 based on the analysis data and, according to some embodiments, determine a protection measure for the BMS 1000. For example, the protection measure may include setting of the maximum noise amplitude threshold value, adjustment of an operating voltage of the contactor 11, or the like. However, the above description is an example, and the above description does not limit embodiments according to the present disclosure.

The signal processor 200 may include an antenna 210, an RF tuner 220, an analog-to-digital converter (ADC) 230, a digital signal processor (DSP) 240, and a signal processor controller 250. The signal processor 200 may be an SDR. Hereinafter, in embodiments of FIG. 2, the signal processor 200 is described to be the SDR. In response to the trigger signal $SIG_{TRG}$ received from the battery manager 100, the signal processor 200 may capture, in a frequency domain, the RF signal $SIG_{RF}$ generated during switching of the state of the contactor 11. The signal processor 200 may receive the trigger signal $SIG_{TRG}$ from the MCU and simultaneously (or concurrently) start sampling the RF signal $SIG_{RF}$ received from the contactor 11. For example, the signal processor 200 may sample the RF signal $SIG_{RF}$ including a noise signal. The signal processor 200 may extract a plurality of signal strength values SS by sampling the RF signal $SIG_{RF}$ and generate the state estimate value SEV of the contactor 11 on the basis of the plurality of signal strength values SS. For example, the signal processor 200 may generate noise data such as an analog voltage value by sampling the RF signal $SIG_{RF}$ including noise. Hereinafter, components included in the signal processor 200 are described in more detail.

The antenna 210 may receive the RF signal $SIG_{RF}$. The antenna 210 may receive, through an environment, the RF signal $SIG_{RF}$ generated during switching of the state of the contactor 11. The antenna 210 may convert the RF signal $SIG_{RF}$ into an electrical signal and transmit the electrical signal to the RF tuner 220. For example, the antenna 210 may receive a wideband frequency signal having a frequency of 1 kHz or more and 1 GHz or less.

The RF tuner 220 may output a band signal $SIG_{BD}$ in a preset frequency band from among the RF signal $SIG_{RF}$. For example, the RF tuner 220 may receive the RF signal $SIG_{RF}$ from the antenna 210 and down convert a frequency of the RF signal $SIG_{RF}$ to a preset frequency band. According to some embodiments, the preset frequency band may be 100 KHz or more and 5 MHz or less. For example, the RF tuner 220 may output the band signal $SIG_{BD}$ having a frequency of 100 kHz or more and 5 MHz or less, from among the RF signal $SIG_{RF}$ having a frequency of 1 kHz or more and 1 GHz or less. According to some embodiments, widths of a plurality of frequency bands may be the same as one another on a log scale. According to other embodiments, the widths of the plurality of frequency bands may be the same as one another. The RF tuner 220 may transmit the down converted band signal $SIG_{BD}$ to the ADC 230.

The ADC 230 may convert the band signal $SIG_{BD}$ into a digital signal $SIG_{DIG}$. The ADC 230 may sample the band signal $SIG_{BD}$ having an analog form and convert the band signal $SIG_{BD}$ into the digital signal $SIG_{DIG}$. For example, the ADC 230 may have a 30 mega samples per second (MSPS) specification. The ADC 230 having a sampling rate of 30 MSPS may extract 30 million signal samples per second. According to Nyquist sampling theory, a sampling process performed at the sampling rate of 30 MSPS may be sufficient to capture a signal having a frequency 100 kHz or more and 5 MHz or less. The ADC 230 may sample the band signal $SIG_{BD}$ and extract a digital value indicating an amplitude value at a particular point in time of an analog signal. The ADC 230 may transmit the digital signal $SIG_{DIG}$ to the DSP 240.

According to some embodiments, the signal processor 200 may further include a digital oscillator, a digital mixer, and a band-pass filter. For example, the digital oscillator, digital mixer, and the band-pass filter may be located between the ADC 230 and the DSP 240.

The digital oscillator and the digital mixer may convert a frequency of the digital signal $SIG_{DIG}$. The band-pass filter may be a filter that passes only a signal between particular frequencies. The band-pass filter may extract only a signal between particular frequencies from the digital signal $SIG_{DIG}$ received from the ADC 230. For example, the band-pass filter may be a low-pass filter. However, the above description is only an example and does not limit embodiments according to the present disclosure.

The DSP 240 may perform Fourier transform (FT) on the digital signal $SIG_{DIG}$ to transform the digital signal $SIG_{DIG}$ into a frequency domain signal $SIG_{FD}$. The DSP 240 may extract the frequency domain signal $SIG_{FD}$ by decomposing the digital signal $SIG_{DIG}$ in a time domain into a frequency component. The DSP 240 may generate the plurality of signal strength values SS from the frequency domain signal $SIG_{FD}$. The plurality of signal strength values SS may include features (e.g., noise and the like) of the RF signal $SIG_{RF}$. The DSP 240 may perform signal processing on the digital signal $SIG_{DIG}$ by using various types of algorithms. For example, the DSP 240 may extract the frequency domain signal $SIG_{FD}$ by performing fast Fourier transform (FFT) on the digital signal $SIG_{DIG}$ in the time domain. The DSP 240 may transmit the plurality of signal strength values SS to the signal processor controller 250.

The signal processor controller 250 may control the antenna 210, the RF tuner 220, the ADC 230, and the DSP 240 in response to the trigger signal $SIG_{TRG}$. For example, the signal processor controller 250 may be an SDR controller.

The signal processor controller 250 may transmit the plurality of signal strength values SS to the contactor state estimator 300. The signal processor controller 250 may communicate with a user interface. The signal processor controller 250 may communicate with an external network and hardware. For example, the signal processor controller 250 may generate RF raw signal data including a noise pattern on the basis of the received RF signal $SIG_{RF}$ and transmit the RF raw signal data to the contactor state estimator 300.

The contactor state estimator 300 may generate the state estimate value SEV for estimating the state of the contactor 11 by receiving the plurality of signal strength values SS and inputting the plurality of signal strength values SS into a pre-trained neural network model. The contactor state estimator 300 may analyze noise data by using an algorithm and estimate features, causes, effects, and the like of noise included in the RF signal $SIG_{RF}$. For example, the noise data may include information such as an average amplitude of a signal and a peak frequency of noise.

The contactor state estimator 300 may detect an abnormal state of the contactor 11 by learning the noise data extracted from the RF signal $SIG_{RF}$ by using a pre-trained ANN. The contactor state estimator 300 may learn state data of the contactor 11 by using the ANN and determine whether the state of the contactor 11 is a normal state or an abnormal state, on the basis of new data (e.g., the RF signal $SIG_{RF}$ generated from the contactor 11). For example, the ANN may be a convolutional neural network (CNN). The CNN may extract useful features from a frequency-based noise pattern and extract, on the basis of the same, an operation state of the contactor 11.

According to some embodiments, the contactor state estimator 300 may transmit the state estimate value SEV of the contactor 11 to the BMS 1000. For example, the contactor state estimator 300 may transmit the state estimate value SEV of the contactor 11 to the BMS 1000 through an SPI protocol. For example, the state estimate value SEV of the contactor 11 may be an analysis data packet in the form of noise pattern: [data], frequency: [data], amplitude: [data].

Figure 3:
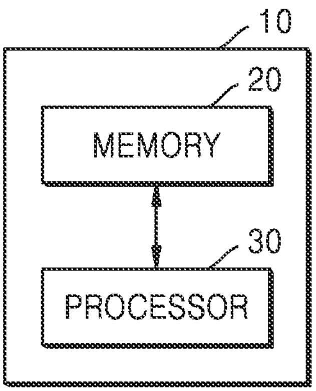
FIG. 3 is a schematic block diagram of a computing apparatus for executing a method of operating a battery management system, according to some embodiments of the present disclosure.

FIG. 3 is a schematic block diagram of a computing apparatus for executing a method of operating a BMS, according to some embodiments of the present disclosure.

Referring to FIG. 3, a computing apparatus 10 according to some embodiments of the present disclosure may include a memory 20 and a processor 30.

The memory 20 may be a recording medium readable by the computing apparatus 10 and may include a permanent mass storage device such as random access memory (RAM), read only memory (ROM), and a disk drive.

The memory 20 may perform a function of temporarily or permanently storing data processed by the processor 30. The memory 20 may include magnetic storage media or flash storage media, but the scope of the present disclosure is not limited thereto. For example, the memory 20 may receive pieces of data constituting an ANN and temporarily and/or permanently store the data. The memory 20 may store training data for training the ANN. However, the above description is only an example, and the spirit and scope of embodiments of the present disclosure are not limited thereto.

According to some embodiments of the present disclosure, the memory 20 may store program code for executing a method of operating a BMS, pieces of data for executing the program code, and pieces of data generated in a process of executing the program code. The program code may include algorithm code for Fourier transform and an ANN model operation.

The memory 20 may store pieces of data for executing a method of operating a BMS, according to the present disclosure. For example, the memory 20 may store data for training the ANN. For example, the memory 20 may store, as training data, a plurality of signal strength values generated by preprocessing a state of a contactor switched by a control signal of a battery manager and an RF signal generated during switching of the state of the contactor.

The processor 30 may generally control an overall operation of the computing apparatus 10. The processor 30 may be configured to process instructions of a computer program by performing basic arithmetic, logic, and input/output operations. The processor 30 may receive the training data and generate training result data from the received training data according to a preprocessing method selected by a user. For example, the processor 30 may receive RF signal data of the contactor and generate state data of the contactor from the RF signal data of the contactor.

The processor 30 described above may refer to, for example, a data processing device embedded in hardware, which has a circuit physically structured to perform a function expressed as by code or instructions included in a program. Examples of the data processing device embedded in hardware may include processing devices such as a microprocessor, a central processing unit (CPU), a processor core, a multiprocessor, an application-specific integrated circuit (ASIC), and a field programmable gate array (FPGA), but the scope of the present disclosure is not limited thereto.

The processor 30 may receive data stored in the memory 20 and transmit data to the memory 20. In some embodiments, according to some embodiments, the computing apparatus 10 may further include a communication module, an input/output device, a storage device, and the like, in addition to the memory 20 and the processor 30.

The operation of the processor 30 according to various embodiments is described below in more detail.

Figure 4:
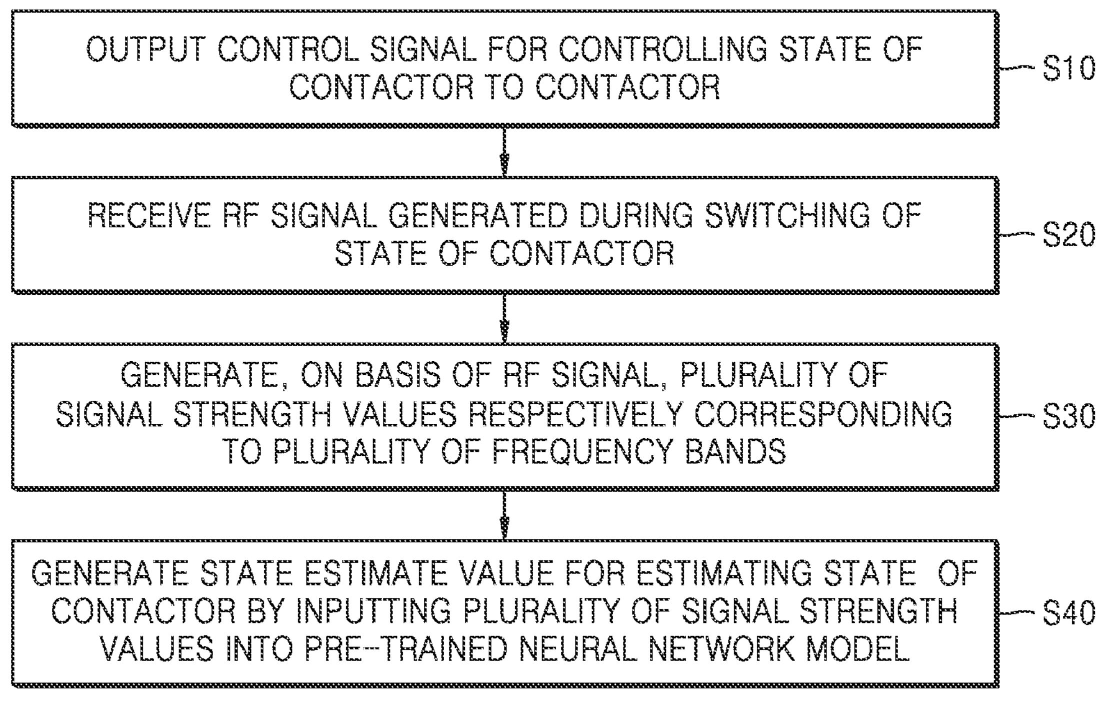
FIG. 4 is a flowchart illustrating a method of operating a battery management system, according to some embodiments of the present disclosure.

FIG. 4 is a flowchart illustrating a method of operating a BMS, according to some embodiments of the present disclosure. Although various operations are illustrated in FIG. 4, embodiments according to the present disclosure are not limited thereto. For example, according to some embodiments, the method of operating a BMS may include additional operations or fewer operations, and the order of the operations may vary, unless otherwise stated or implied, without departing from the spirit and scope of embodiments according to the present disclosure.

Referring to FIG. 4, the method of operating the BMS may be performed by the processor 30 of FIG. 3.

In operation S10, a control signal for controlling a state of a contactor connected to a battery may be output to the contactor. The control signal may include a turnon signal for switching the contactor to an open state and a turnoff signal for switching the contactor to a closed state. In operation S10, a trigger signal may be extracted in response to the output of the control signal, and an RF signal may be captured in response to the trigger signal.

In operation S20, the RF signal generated during switching of the state of the contactor may be received. In operation S20, the RF signal may be received from the contactor, and a band signal in a preset frequency band from among the RF signal may be output. In some embodiments, the band signal may be transformed into a digital signal, Fourier transform may be performed on the digital signal to transform the digital signal into a frequency domain signal, and a plurality of signal strength values may be generated from the frequency domain signal.

In operation S30, the plurality of signal strength values respectively corresponding to a plurality of frequency bands may be generated on the basis of the RF signal. In operation S30, the plurality of signal strength values may be generated in response to the trigger signal.

A state estimate value for estimating the state of the contactor may be generated by inputting the plurality of signal strength values into a pre-trained neural network model. The pre-trained neural network model may generate the state estimate value of the contactor according to the plurality of signal strength values, which are received as an input, and a confidence score of the state estimate value. The neural network model is described in more detail with reference to FIGS. 5A to 5C.

Operation S40 may further include an operation of detecting whether the contactor is in an abnormal state, on the basis of the state estimate value of the contactor and the confidence score of the state estimate value. For example, if the state of the contactor according to the state estimate value of the contactor, which responds to the turn on signal, is the closed state in operation S40, the state of the contactor may be determined as the abnormal state. If the state of the contactor according to the state estimate value of the contactor, which responds to the turnoff signal, is the open state in operation S40, the state of the contactor may be determined as the abnormal state. If the state of the contactor according to the state estimate value of the contactor is a weld state in operation S40, the state of the contactor may be determined as the abnormal state.

Hereinafter, aspects of an example structure of an ANN are described in more detail with reference to FIGS. 5A to 5C.

Figure 5A:
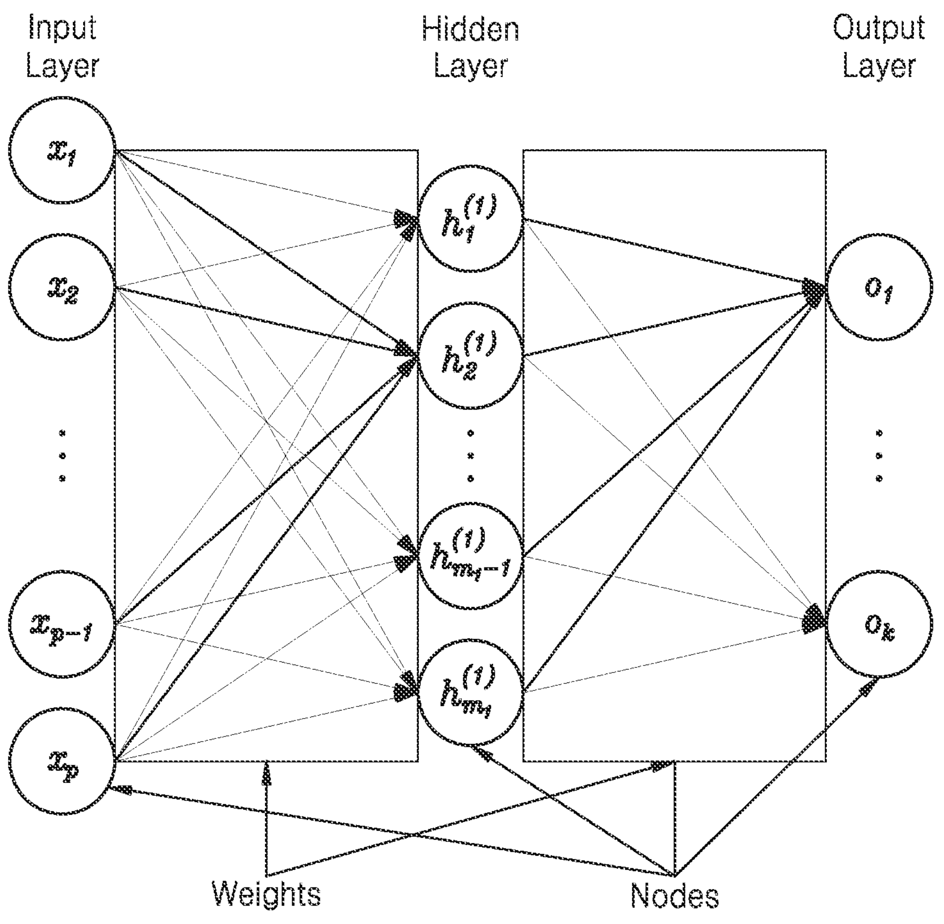
FIG. 5A is a view illustrating an example structure of a pre-trained artificial neural network (ANN) model according to some embodiments of the present disclosure.
Figure 5B:
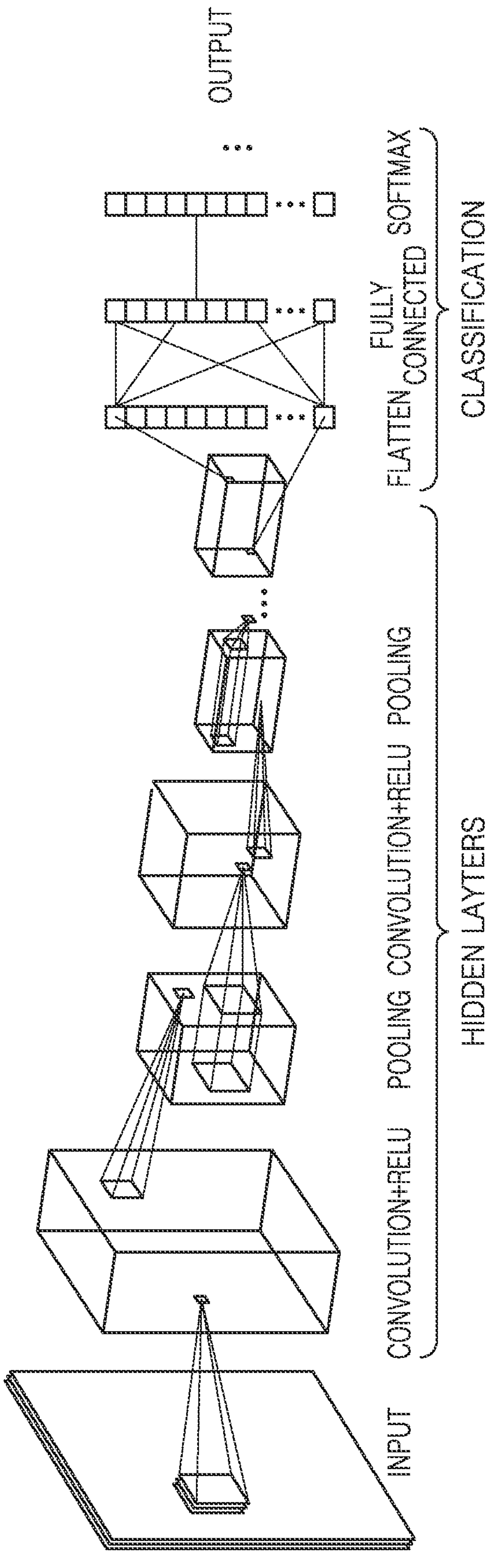
FIG. 5B schematically illustrates an example of a pre-trained ANN model according to some embodiments of the present disclosure.

FIGS. 5A to 5C are views illustrating example structures of an ANN trained by the processor 30 of FIG. 3, according to the present disclosure. An ANN model illustrated in FIGS. 5A to 5C may be included in the contactor state estimator 300 of FIG. 1.

FIG. 5A is a view illustrating an example structure of a pre-trained ANN model according to some embodiments of the present disclosure.

Referring to FIG. 5A, components of an ANN may include nodes/units, layers, weights, summations, and functions.

The nodes (or units) are components that constitute each layer. The layer may be at least one of an input layer, a hidden layer, or an output layer. The input layer may be a layer that receives input data. The input layer may receive a plurality of pieces of input data (e.g., $x_1$, $x_2$, . . . , $x_{p-1}$, and $x_p$ of FIG. 5A). p may be a natural number of 1 or more. According to some embodiments, the plurality of pieces of input data may be a plurality of pieces of RF signal data generated from a contactor in a BMS. The hidden layer may process the pieces of input data at least once. The hidden layer may be a layer including nodes (e.g., $h_1^{(1)}$, $h_2^{(1)}$, . . . , $h_{m1-1}^{(1)}$, and $h_{m1}^{(1)}$ of FIG. 5A) that multiply the pieces of input data by weights and generate results of the activation functions. m may be a natural number of 1 or more. The hidden layer may include a plurality of layers. According to some embodiments, for example, another hidden layer may be a layer including a plurality of nodes (e.g., $h_1^{(2)}$, $h_2^{(2)}$, . . . , $hm_{2-1}^{(2)}$, and $h_{m2}^{(2)}$. The output layer may be a layer including nodes (e.g., $o_1$, . . . , and $o_k$ of FIG. 5A) that multiply a final hidden layer or the input layer by a weight and generate a result value of an output function. k may be a natural number of 1 or more. According to some embodiments, the result value of the output function may be state data of the contactor generated on the basis of the RF signal data generated from the contactor.

Functions may be at least one of an activation function, an output function, or a loss function. The activation function may be a function that processes the sum of the product of a node and a weight and may calculate a node value of the hidden layer. The weight may indicate a connection strength between nodes. The summation may indicate summing the products of weights and nodes.

Referring to the example of FIG. 5A, a $k^{th}$ hidden node $h_k^{(l)}$ of an $l^{th}$ layer may be defined according to $$h_k^{(l)} = f^{(l)}\left(\sum_{j=1}^{m_{l-1}} w_{kj}^{(l-1)} h_j^{(l-1)} + b_k^{(l-1)}\right) \cdot f^{(l)}$$

may be an activation function for the $l^{th}$ hidden layer, $w_k^{(l)}$ may be a weight vector, and $b_k^{(l)}$ may be bias for a $k^{th}$ node of an $l^{th}$+1 layer. The output function may be a function that processes the product of a node and a weight of the last hidden layer and may calculate values of the nodes (e.g., $o_1$, . . . , and $o_k$) of the output layer. The loss function may be a function that measures, for learning a weight, an error between a result of the output function and a response value.

According to some embodiments, the ANN model described above may be a neural network model that is pre-trained with training data including a plurality of signal strength values generated by preprocessing a state of a contactor switched by a control signal of a battery manager and an RF signal generated during switching of the state of the contactor.

FIG. 5B schematically illustrates an example of a pre-trained ANN model according to some embodiments of the present disclosure.

An ANN according to some embodiments of the present disclosure may be an ANN according to a CNN model as illustrated in FIG. 5B. In some embodiments, the CNN model may include a plurality of hidden layers and a classification layer. The CNN model may be a hierarchical model used to finally extract features of input data INPUT by alternately performing a plurality of operation layers (e.g., convolution layers and pulling layers) in the plurality of hidden layers. In some embodiments, the processor 30 of FIG. 3 according to some embodiments of the present disclosure may establish or train an ANN model by processing training data according to a supervised learning technique.

The processor 30 of FIG. 3 according to some embodiments of the present disclosure may generate a convolution layer for extracting feature values of the input data INPUT and a pooling layer constituting a feature map by combining the extracted feature values. Feature information for classifying the input data INPUT may be extracted from the convolution layer. The processor 30 of FIG. 3 may generate a feature map on the basis of the feature information of the input data INPUT. As a phase following the convolution layer, a rectified linear unit (ReLu) activation function may be used. The ReLu activation function may be a non-linearity function and may increase non-linearity in a layer representing basic linear features. By receiving output data of the convolution layer in the pooling layer, a size of the output data (e.g., an activation map) may be reduced or particular data may be emphasized.

The processor 30 of FIG. 3 according to some embodiments of the present disclosure may generate, by combining feature maps, a fully connected layer that arranges for determining a probability that the input data INPUT corresponds to each of a plurality of items. The fully connected layer may be a phase of determining classification in the final phase of the CNN model. The fully connected layer may include a fully-connected layer that performs flattening to convert each layer into a one-dimensional vector, and then connects the layers converted into one-dimensional vectors into one vector. A class with the highest probability may be classified as an output by using a softmax function. The processor 30 of FIG. 3 according to some embodiments of the present disclosure may calculate an output layer including an output corresponding to the input data INPUT.

FIG. 5C is an example schematically illustrating a process of training a pre-trained ANN model, according to some embodiments of the present disclosure.

FIG. 5C illustrates a CNN model in which an antenna 210 of the SDR 200 of FIG. 2 receives an RF signal generated during switching of a state of a contactor and uses RF raw signal data as input data. For example, the RF raw signal data may include a noise signal. The RF raw signal data may include a pattern of the noise signal. The CNN model may be trained by using, as training data, a plurality of signal strength values generated by preprocessing the state of the contactor and the RF signal generated during switching of the state of the contactor.

Conv1D layer of FIG. 5C may indicate the convolution layer of FIG. 5B. The Conv1D layer may learn features of input data by using a filter. For example, the Conv1D layer may receive the RF signal as the input data, and learn a pattern of the RF signal as the features of the input data. An ReLU activation function of FIG. 5C may indicate the ReLU of FIG. 5B. The ReLU activation function may add non-linearity to the input data. For example, the CNN model may learn a more complex pattern of the RF signal by adding non-linearity to the RF signal received as the input data. A pooling layer of FIG. 5C may indicate the pooling layer of FIG. 5B. The pooling layer may down sample data to prevent or reduce overfitting and increase computational efficiency. The processes of the Conv1D layer, the ReLU activation function, and the pooling layer described above may be repeated. A flatten layer and a fully connected layer are as described above with reference to FIG. 5B.

Output data may be output data generated and classified on the basis of the input data. According to some embodiments, the output data may be a state value of the contactor and a confidence score of the state value of the contactor. For example, the state of the contactor according to the state value of the contactor may be any one of open, closed, and weld states. The confidence score of the state value of the contactor may be a value of 0 or more and 1 or less.

An ANN model may receive a plurality of pieces of RF signal data and transmit a state estimate value (e.g., diagnostic data) of the contactor to a BMS on the basis of data learned as described above.

The ANN according to the CNN model illustrated in FIGS. 5B and 5C is an example, and the spirit of the present disclosure is not limited thereto. In some embodiments, the ANN may be stored in a memory described above in the form of a coefficient of at least one node constituting the ANN, a weight of the node, and coefficients of a function defining a relationship between a plurality of layers constituting the ANN. In some embodiments, the structure of the ANN may also be stored in the memory in the form of source code and/or a program.

The types and/or structures of the ANN described above with reference to FIGS. 5A to 5C are examples, and the spirit of the present disclosure is not limited thereto. In some embodiments, various types of models of ANNs may correspond to ANNs described throughout the description. According to some embodiments, a model such as a deep neural network (DNN), a CNN, a recurrent neural network (RNN), or a bidirectional recurrent deep neural network (BRDNN) may be used as an ANN according to some embodiments of the present disclosure, but the present disclosure is not limited thereto.

According to some embodiments of the present disclosure, compared to some methods of detecting a state of a contactor by using a physical sensor, much hardware may not be needed, and an abnormal state of a contactor may be relatively more accurately detected by pre-learning a pattern of an RF signal. In some embodiments, the safety and confidence level of a BMS for a vehicle may be relatively improved by monitoring the state of the contactor in real time and relatively quickly detecting the abnormal state of the contactor in the BMS.

The electronic or electric devices and/or any other relevant devices or components according to some embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of embodiments of the present invention.

Effects that may be obtained through the present disclosure are not limited to the above-described effects, and other technical effects not mentioned may be clearly understood by one of ordinary skill in the art from the description of the present disclosure described below.

Various embodiments of the present disclosure do not limit the scope of the present disclosure in any manner. For simplicity of the description, descriptions of some electronic components, control systems, software, and other functional aspects of the systems may be omitted unless necessary to enable a person having ordinary skill in the art to understand, make, and use embodiments according to the present disclosure. Connections or connection units of lines between components shown in the drawings may illustrate functional connections and/or physical or circuit connections, and may be implemented as various alternative or additional functional connections, physical connections, or circuit connections in actual devices. Unless there are particular comments such as "essential" or "significantly", they may not be necessary components for the implementation of the present disclosure.

In the description of the present disclosure (particularly, in claims), the use of the term "the" and similar indicative terms may correspond to both singular and plural forms. If a range is described in the present disclosure, it includes an invention to which individual values within the range are applied (unless there is a contrary description), and each individual value constituting the range is described in the description of the present disclosure. Unless there is an explicit order or statement to the contrary regarding operations constituting a method according to the present disclosure, the operations may be performed in any appropriate order. The present disclosure is not necessarily limited according to the order of description of the operations. In the present disclosure, the use of all examples or example terms (e.g., etc.) is simply to describe the present disclosure in detail, and the scope of the present disclosure is not limited by the above examples or example terms unless limited by claims. One of ordinary skill in the art may appreciate that various modifications, combinations, and changes may be made according to design conditions and factors within the scope of the appended claims or equivalents thereof.

Therefore, the spirit of the present disclosure should not be limited to the above-described embodiments, and not only claims described below, but also all scopes equivalent to or equivalently changed from these claims fall within the scope of the spirit of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims.

What is claimed is:

1. A battery management system comprising:

a contactor connected to a battery;

a battery manager configured to output a control signal for controlling a state of the contactor to the contactor;

a signal processor configured to receive a radio frequency (RF) signal generated during switching of the state of the contactor and to generate, based on the RF signal, a plurality of signal strength values respectively corresponding to a plurality of frequency bands; and a contactor state estimator configured to generate a state estimate value for estimating the state of the contactor by receiving the plurality of signal strength values and inputting the plurality of signal strength values into a pre-trained neural network model.

2. The battery management system as claimed in claim 1, wherein the battery manager is further configured to output a trigger signal to the signal processor in response to the output of the control signal, and the signal processor is further configured to capture the RF signal in response to the trigger signal.

3. The battery management system as claimed in claim 2, wherein the signal processor comprises:

an antenna configured to receive the RF signal;

an RF tuner configured to output a band signal in a preset frequency band from among the RF signal;

an analog-to-digital converter (ADC) configured to convert the band signal into a digital signal;

a digital signal processor (DSP) configured to transform the digital signal into a frequency domain signal by performing Fourier transform on the digital signal and to generate the plurality of signal strength values from the frequency domain signal; and a signal processor controller configured to control the antenna, the RF tuner, the analog-to-digital converter (ADC), and the digital signal processor (DSP) in response to the trigger signal and to transmit the plurality of signal strength values to the contactor state estimator.

4. The battery management system as claimed in claim 3, wherein the preset frequency band is 100 KHz or more and 5 MHz or less.

5. The battery management system as claimed in claim 1, wherein widths of the plurality of frequency bands are equal to one another on a log scale.

6. The battery management system as claimed in claim 1, wherein widths of the plurality of frequency bands are equal to one another.

7. The battery management system as claimed in claim 1, wherein the neural network model is a convolutional neural network (CNN) model and is pre-trained with training data comprising the plurality of signal strength values generated by preprocessing the state of the contactor switched by the control signal of the battery manager and the RF signal generated during switching of the state of the contactor.

8. The battery management system as claimed in claim 1, wherein the control signal comprises: a turn on signal for switching the contactor to an open state; and a turn off signal for switching the contactor to a closed state.

9. The battery management system as claimed in claim 8, wherein the pre-trained neural network model is configured to output the state estimate value according to the plurality of signal strength values, which are received as an input, and a confidence score of the state estimate value.

10. The battery management system as claimed in claim 9, wherein the battery manager is configured to detect whether the contactor is in an abnormal state, based on the state estimate value and the confidence score of the state estimate value.

11. The battery management system as claimed in claim 10, wherein the battery manager is further configured to determine the state of the contactor as the abnormal state, based on at least one state from among the closed state according to the state estimate value of the contactor that responds to the turn on signal, the open state according to the state estimate value of the contactor that responds to the turn off signal, and a weld state according to the state estimate value of the contactor.

12. A method of operating a battery management system comprising a contactor connected to a battery, the method comprising:

outputting a control signal for controlling a state of the contactor to the contactor;

receiving a radio frequency (RF) signal generated during switching of the state of the contactor;

generating, based on the RF signal, a plurality of signal strength values respectively corresponding to a plurality of frequency bands; and generating a state estimate value for estimating the state of the contactor by inputting the plurality of signal strength values into a pre-trained neural network model.

13. The method as claimed in claim 12, further comprising:

extracting a trigger signal in response to the output of the control signal; and capturing the RF signal in response to the trigger signal.

14. The method as claimed in claim 13, further comprising:

receiving the RF signal;

outputting a band signal in a preset frequency band from among the RF signal;

converting the band signal into a digital signal;

transforming the digital signal into a frequency domain signal by performing Fourier transform on the digital signal and generating the plurality of signal strength values from the frequency domain signal; and extracting the plurality of signal strength values in response to the trigger signal.

15. The method as claimed in claim 12, wherein the control signal comprises a turn on signal for switching the contactor to an open state and a turn off signal for switching the contactor to a closed state.

16. The method as claimed in claim 15, wherein the pre-trained neural network model is configured to generate the state estimate value according to the plurality of signal strength values, which are received as an input, and a confidence score of the state estimate value.

17. The method as claimed in claim 16, further comprising detecting whether the contactor is in an abnormal state, based on the state estimate value and the confidence score of the state estimate value.

18. The method as claimed in claim 17, further comprising determining the state of the contactor as the abnormal state, based on at least one state from among the closed state according to the state estimate value of the contactor that responds to the turn on signal, the open state according to the state estimate value of the contactor that responds to the turn off signal, and a weld state according to the state estimate value of the contactor.

* * * * *